United States Patent [19]

Harrison

[11] 4,156,565

[45] May 29, 1979

[54] CONTROL SYSTEM FOR FLASH-ILLUMINATED AUTOMATIC FOCUSING CAMERA

[75] Inventor: George C. Harrison, Chelmsford, Mass.

[73] Assignee: Polaroid Corporation, Cambridge, Mass.

[21] Appl. No.: 889,251

[22] Filed: Mar. 23, 1978

[51] Int. Cl.² .............................................. G03B 15/05
[52] U.S. Cl. .................................... 354/149; 354/60 F
[58] Field of Search ............... 354/34, 25, 60 R, 60 F, 354/83, 163, 165, 139, 149, 145, 195; 352/140

[56] References Cited

U.S. PATENT DOCUMENTS

| | | | |
|---|---|---|---|
| 3,522,764 | 8/1970 | Biber et al. | 354/195 |
| 3,713,731 | 1/1973 | Kurihara et al. | 354/25 |
| 3,813,679 | 5/1975 | Hasegawa et al. | 354/25 X |
| 3,846,812 | 11/1974 | Biber | 354/145 |
| 3,917,395 | 11/1975 | Ogawa | 354/145 X |
| 3,919,593 | 11/1975 | Nakamura | 354/145 X |
| 4,001,639 | 1/1977 | Biber | 315/241 P |
| 4,001,640 | 1/1977 | Biber | 354/145 X |
| 4,064,519 | 12/1977 | Kee | 354/145 X |
| 4,067,030 | 1/1978 | Kuramoto et al. | 354/139 |
| 4,068,151 | 1/1978 | Harrison | 315/241 P |

Primary Examiner—L. T. Hix
Assistant Examiner—William B. Perkey
Attorney, Agent, or Firm—Edward S. Roman

[57] ABSTRACT

A self-developing camera with automatic focusing has a charge control system which charges the flash tube capacitor while other camera functions are inactive, and which disables capacitor charging during automatic focusing and during the film-related operations of exposure, transport, and processor-spreading. An enabling stage allows flash-illuminated exposure only when the storage capacitor is properly charged. The charge control system thus schedules high current operations to occur one at a time so that a single battery can power all camera operations. Further, it inhibits exposure under conditions of inadequate flash readiness. The control system affords the user of an SLR camera with a viewing interval between automatic focusing and exposure.

12 Claims, 7 Drawing Figures

CONTROL SYSTEM FOR FLASH-ILLUMINATED AUTOMATIC FOCUSING CAMERA

BACKGROUND

This invention relates to electrical apparatus for powering automatic self-developing camera equipment from a battery of limited capacity. More particularly, the invention provides electrical control apparatus which limits the charging of a photographic flash tube to selected operating conditions when other powered elements of the camera system are quiescent. The control apparatus also restricts exposure, and hence film consumption, to selected conditions of flash tube readiness.

It is known in the art to control the operating sequence of an automatic self-developing camera to enable a single battery of limited capacity to power the entire camera cycle. U.S. Pat. No. 3,846,812, for example, discloses equipment which operates a flash camera of the automatic self-developing type so that only one operation of significant current drain occurs at a time. The film transport motor and the flash unit accordingly draw battery current at different times.

The advent of automatic focusing for cameras imposes an additional operation of relatively high current drain on the camera battery. When this operation overlaps with another operation of significant current drain, the battery voltage is likely to drop to such a degree that the battery is incapable of properly operating the camera. The camera then malfunctions with loss of the picture in process and typically with significant user irritation. U.S. Pat. No. 3,522,764 discloses one automatic focusing camera, and pending applications Ser. No. 729,289 for "Automatic Focusing Camera" by E. Shenk and Ser. No. 729,392 for "Ultrasonic Ranging System for Camera", by J. Muggli disclose further systems for automatic camera focusing, which as used herein includes ranging.

The user moreover is not to be burdened with separate switches for each aspect of camera operation. For example, it would be unsatisfactory to have separate switches for the automatic focus operation, for the flash charging operation, and for transporting a film unit through the rollers which initiate the developmental processing of the film. Moreover, these and other operating steps are to be controlled in a manner that maximizes the likelihood of securing a "perfect" picture with each exposure. Thus, it is not satisfactory to allow the charge on the flash tube capacitor to degrade beyond a controlled limit before exposure, while the capacitor focuses and frames the camera, for the resultant illumination would be deficient and the picture would be underexposed.

Other prior art includes U.S. Pat. No. 4,001,639 which discloses camera equipment that inhibits the charging of a flash unit when the camera battery voltage is low. It is also known, for example from U.S. Pat. No. 4,064,519, to inhibit the operation of a camera when the flash tube capacitor has insufficient charge, or when all flash bulbs in an array are spent.

It is an object of this invention to provide an automatically-focusing self-developing flash camera which can be powered by a single battery. To this end, it is an object of the invention to provide a self-developing camera having automatic focusing, automatic exposure control, and automatic advance of exposed film, and which charges the flash tube capacitor only at times other than those operations. It is a further object of the invention to provide a camera control system for attaining the foregoing features in a manner which sequences the camera operations for high user convenience. In this regard, it will be appreciated that imposing the constraints of the battery system on the camera user would be unsatisfactory.

It is also an object of the invention to provide camera control equipment for providing the foregoing operation and which allows a film unit to be exposed only when the flash tube capacitor is properly charged.

It is another object of the invention to provide a control system of the above character for a single lens reflex camera in which the viewfinder is only in focus after the auto-focus operation.

Other objects of the invention will in part be obvious and will in part appear hereinafter.

GENERAL DESCRIPTION

An automatically-focusing camera embodying the invention has a novel electronic system which charges the storage capacitor for powering the flash tube and which provides at least partial control of exposure with flash illumination. The system operations provide two inter-related advantages. One is to enhance the reliability of the multiple automatic camera operations under power from a single battery. The other is to prevent flash-illuminated exposure, and hence film consumption, when the flash unit has insufficient charge.

In a rangefinder camera, automatic focusing and flash-illuminated film exposure operations can proceed immediately after the control sytem has charged the flash tube capacitor. Hence, once the flash tube capacitor is charged and the user frames the scene to be photographed, all other operations can, with this type of camera, proceed in automatic sequence without operator intervention other than depressing the shutter button 29. Initiation of these operations signals the control system to disable the charge operation until the camera cycle is completed. The camera battery thus powers only one high current operation at a time, i.e., the sequence of capacitor charging, automatic focusing, exposure control and film transport. Typically there is a focus reset or return operation at the end of the cycle.

A further feature of the invention is to provide the user of a single lens reflex camera with a time in which to preview, i.e., frame and compose, the scene to be photographed after the automatic focusing operation and prior to exposure. This time is needed because a single lens reflex viewfinder is normally out of focus. The operator hence can not preview a scene until the camera is focused. The charge control system of this invention provides a normally ample but limited time, after initiation of automatic focusing, during which the operator can preview the scene before exposing the film. Th flash tube capacitor is not charged during the preview interval, and hence the charge system does not draw battery current.

Where the user delays the exposure step more than the prescribed preview time, the control system automatically disables the exposure mechanism to avoid a faulty exposure due to an underpowered flash tube. The user can re-charge the flash tube capacitor and then initiate another preview time. This ensures that the flash tube has the proper level of power for the prescribed flash illumination.

These features of the invention allow the camera to operate with a single battery, typically the one packaged with a set of film units. From the point of view of the user, providing the foregoing features enhances the likelihood that a photograph will be properly focused, properly exposed, and properly processed for development. The charge control system thus tends to promote correct operation and a satisfactory resultant photograph. Further, providing these features makes it possible for a self-developing camera with automatic focus and automatic exposure control to employ flash illumination, all with a single battery and in a manner that ensures that the battery will normally operate the camera for all the film units in a packaged set.

A charge control system providing the foregoing features has a discretely-regulated d.c. to d.c. converter for charging the flash tube capacitor. Control elements schedule either the capacitor charging operation or another battery-powered camera operation but not both, so that the entire camera system draws only a single high current at any time. The control elements inhibit exposure and film processing when the flash tube capacitor has insufficient charge, and inhibit the charge operation during these and other camera operations. A charge control system for a single lens reflex camera, in addition, provides the user with a preview time between the automatic focusing operation and the initiation of exposure and film processing in a manner that ensures sufficient flash tube charge for proper flash illumination.

The invention accordingly comprises the features of construction, combinations of elemements, and arrangement of parts exemplified in the constructions set forth below, and the claims indicate the scope of the invention.

DESCRIPTION OF DRAWINGS

For a fuller understanding of the nature and objects of the invention, reference should be made to the following detailed description and the accompanying drawings, in which.

ILLUSTRATED EMBODIMENTS

Figure 1:
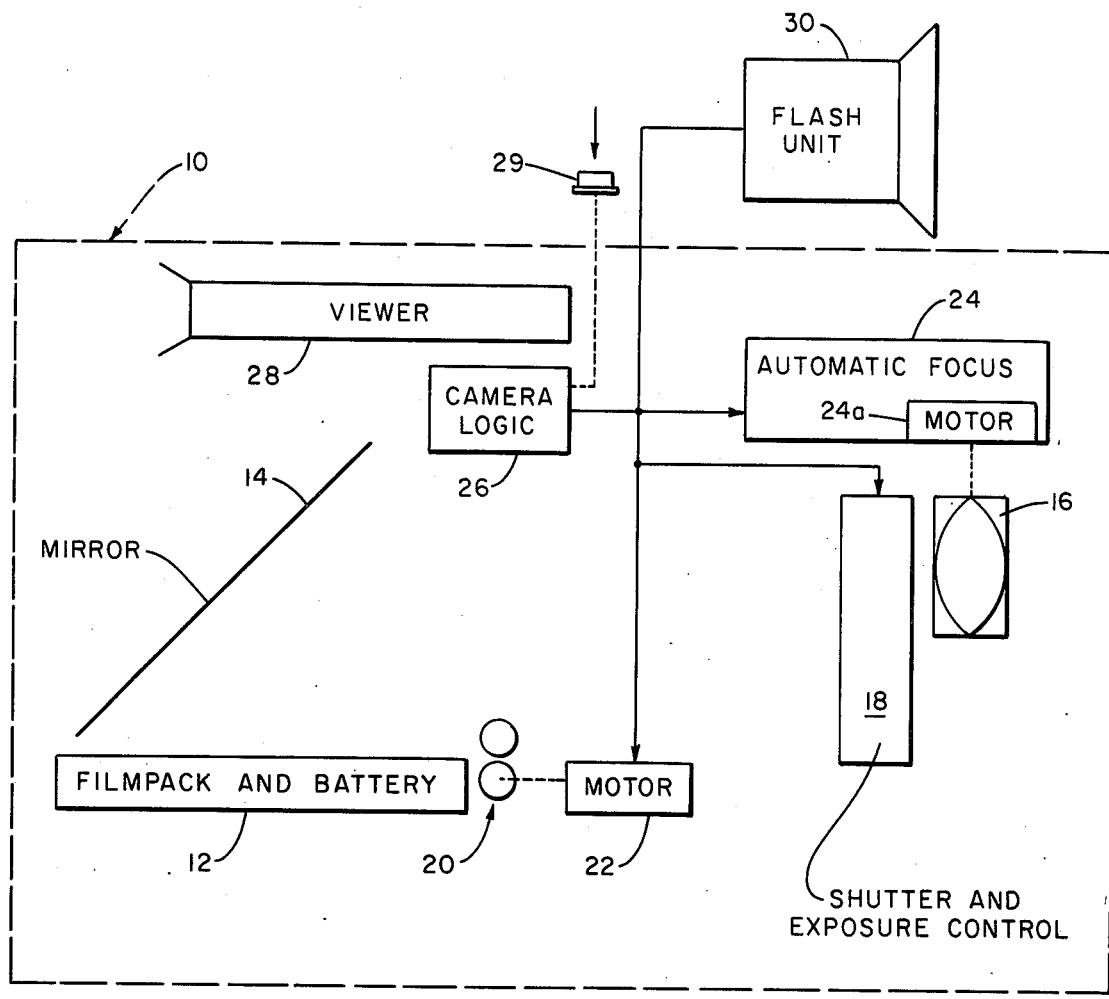
FIG. 1 shows in schematic form a camera with which the invention is used.

A camera 10 equipped with a charge control system in accordance with the invention has, as FIG. 1 diagrammatically shows, a film and battery pack 12 which presents one film unit therein at the image plane and in optical alignment with a mirror reflector 14 and a lens system 16. An exposure control system 18, including a shutter mechanism, is in optical alignment behind the lens system 16. A film transport mechanism, including a pair of spread rolls 20 and a transport motor 22, is arranged to transport an exposed film unit from the film pack 12 and draw it through the spread rolls before discharging it from the camera 10. The camera 10 also has an automatic focusing mechanism 24 with a focusing motor 24a coupled to selectively position the lens system 16. A camera logic unit 26 schedules the camera operations under power from the battery in the pack 12 when initiated by the shutter button 29. The camera also has a viewer 28. The camera 10 is equipped with an electronic flash unit 30, which also operates in conjunction with the logic unit 26 and under power from the single camera battery.

The illustrated flash unit 30 produces a fixed, known quantity of light, and the illustrated camera 10 adjusts the exposure control system 18 for proper film exposure in accordance with the distance to the object being photographed as provided by the automatic ranging elements of the focus mechanism 24. The illustrated camera thus exposes film with a non-automatic strobe or flash unit using a so-called follow-focus exposure control system.

In a camera 10 where the viewer 28 is a simple viewfinder, the operator can view the subject to be photographed independent of the focus condition of the camera. Thus, when the operator has the scene to be photographed properly in view, s/he depresses the shutter button to initiate a camera operating cycle, controlled by the logic unit 26 and the flash unit 30, in which the camera automatically focuses on the subject in the center of the viewfinder, exposes a film unit with flash illumination, and transports the exposed film unit from the film pack through the rollers and discharges it from the camera. Aside from the automatic focusing mechanism 24 and the flash unit 30, the structure and operation of the camera 10 where the viewer 28 is a simple viewfinder are preferably the same as found in a commercially available PRONTO! brand camera marketed by the Polaroid Corporation. Further, the automatic focusing mechanism 24 can be constructed as described in the above-noted U.S. Pat. No. 3,522,764 and patent applications Ser. Nos. 729,289 and 729,392. Accordingly, these elements of the camera 10 are not described further.

Figure 2:
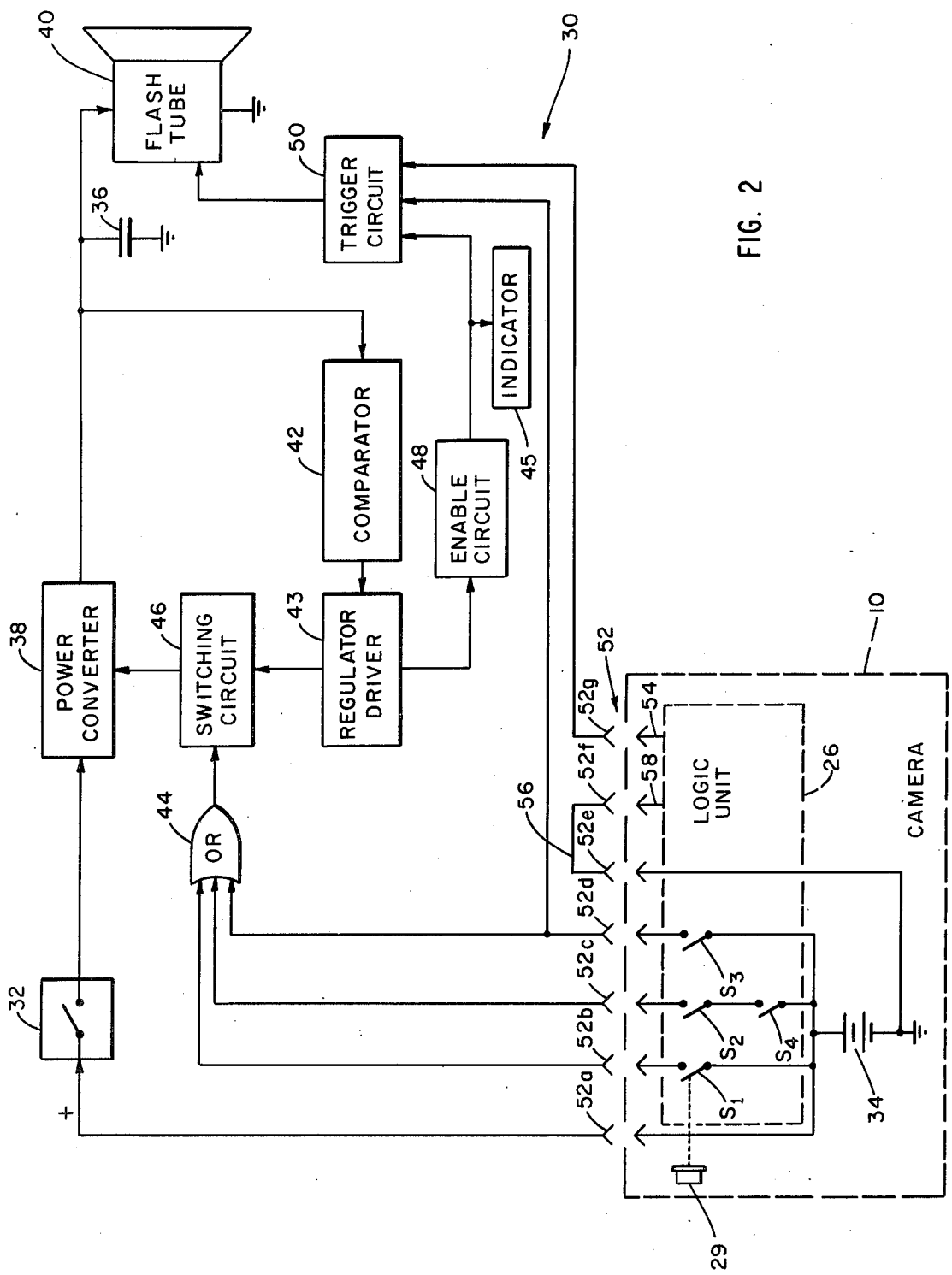
FIG. 2 is a block schematic diagram of a charge control system according to the invention.
Figure 3:
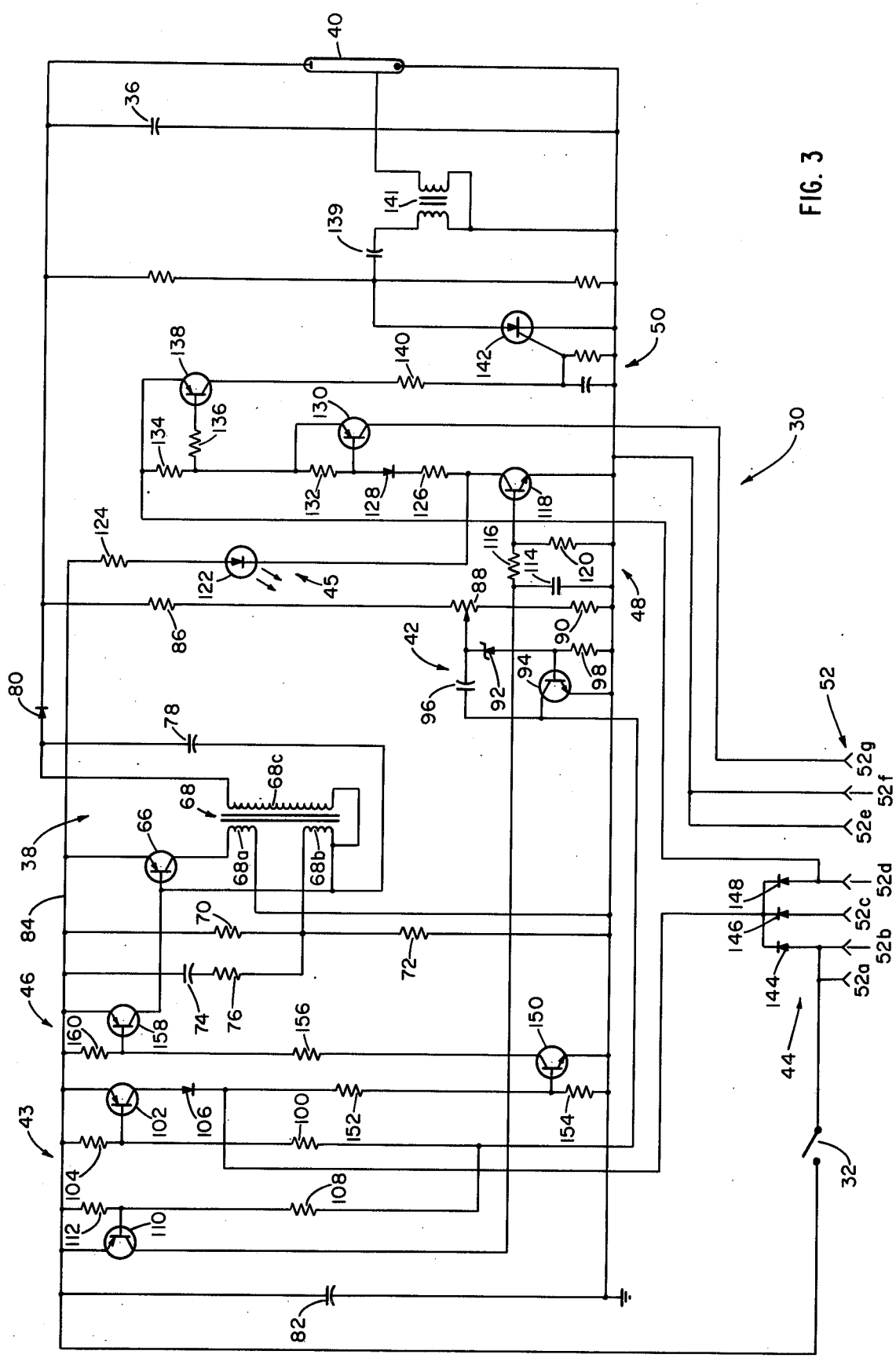
FIG. 3 is a more detailed schematic diagram of the charge control system of FIG. 2.

FIGS. 2 and 3 show a flash unit 30 connected with a viewfinder camera 10 operating in the foregoing manner. As shown schematically in FIG. 2, the flash unit 30 for a viewfinder camera 10 has a charge control system that is activated with a normally-open on-off switch 32 that closes to energize a power converter 38 from the camera battery 34. The power converter 38 develops a high direct voltage which it applies to an energy storage capacitor 36 connected in parallel with a flash tube 40. The charge control system also has a comparator 42 that compares a known portion of the voltage across the storage capacitor 36 with a reference voltage. A normally-inactive regulator driver 43 responds to the signal the comparator produces when the storage capacitor voltage attains a desired level to activate a switching circuit 46 and to activate a normally-disabled enable circuit 48. The switching circuit 46 is normally inactive, but when activated by the regulator driver 43, it disables the power converter 38. The converter then stops charging the capacitor 36, and draws no significant battery 34 current.

The enable circuit 48, upon being activated by the regulator driver, turns on a "ready" indicator 45 and enables a trigger circuit 50 to respond to a flash pulse from the camera. When thus enabled and pulsed, the trigger circuit initiates conduction in the flash tube 40, producing a bright flash of illumination for the camera.

The switching circuit 46 is also activated to switch off the power converter 38 by an assertive signal from an OR gate 44, which is connected to switches within the camera 10 logic unit 26.

FIG. 2 also shows that the flash unit 30 plugs by way of a connector 52 onto the camera 10 to receive voltage from the camera battery 34. The connector 52 also interconnects the flash unit with the camera logic unit 26 for applying, by way of conductor 54, the flash pulse from the camera logic unit to the trigger circuit 50. The illustrated arrangement also includes a conductive jumper 56 within the flash unit which, by way of the connector 52, applies the battery 34 voltage to the camera logic unit 26 via a conductor 58, thereby signalling the logic unit that the flash unit is plugged onto the camera.

The illustrated camera also has three switches S1, S2, and S3, which apply signals, by way of connector 52, to the flash unit. OR circuit 44 to preclude operation of the power converter 38 and thereby to preclude charging of the storage capacitor 36 during selected portions of the camera operating cycle. The net effect of the three switches S1, S2, and S3 is to ensure that the OR circuit 44 receives at least one assertive signal throughout the automatic focusing operation and the exposure, film processing and transport operations, and even the final operation of resetting the automatic focus mechanism to its initial start position. The OR circuit in response disables the capacitor-charging power converter from drawing significant battery current during these camera operations. More particularly, in the illustrated embodiment, switch S1 closes upon depression of the shutter button 29 and remains closed only as long as the operator depresses the shutter button. Switch S3 is a latch-type switch which applies power to the camera logic 26 which in turn powers the transport motor 22 of FIG. 1. It is closed automatically upon depression of the shutter button and hence closes a brief instant after switch S1, and stays closed until the motor 22 rotates the spread rolls 20 to the point where an exposed film unit is fully transported through and out of the camera 10. The switch S2 applies an assertive signal to the flash unit 30 to disable the capacitor charging convertor from drawing battery current during the automatic operation of the focus mechanism in the camera 10 and is shown in FIG. 2 as being in series with a manual switch S4 that the operator must open before manually focusing the camera in order to inhibit the automatic focus operation by means not shown and remove the assertive signal otherwise furnished to the flash 30 by closure of the switch S2. The switch S2 automatically closes after the shutter button is depressed in response to the camera lens system being moved from the rest position and remains closed until the automatic focus mechanism returns the camera lens system 16 to the rest position. The lens system 16 is only in the rest position when the camera is not in an operating condition; that is, no pictures are taken with the lens in the rest position.

The operation of the elements described in FIG. 2 commences when the user turns on the flash unit 30 by closing switch 32. This switch preferably is biased normally open to prevent inadvertent battery drain to the flash unit. Closing switch 32 applies the battery voltage to the power converter 38, which commences charging the storage capacitor 36. When the comparator 42 signals that the voltage stored across the storage capacitor 36 has attained the desired level, the regulator driver 43 activates the switching circuit 46 to terminate further operation of the power converter 38. The driver 43 also activates the enable circuit 48.

While the operator maintains the on/off switch 32 closed, but does not depress the shutter button 29, the capacitor 36 charge begins to dissipate from the selected level. When it drops to a lower threshold level, the comparator 42 no longer activates the regulator driver, and the switching circuit becomes inactive. The power converter 38 then resumes operation and recharges the storage capacitor quickly to the desired level, at which point it is again disabled by the comparator 42, the driver 43 and the switching circuit 46. The power converter 38, comparator 42, driver 43, and switching circuit 46 thus operate as a discretely regulated d.c. to d.c. power converter, and maintain the capacitor, once it is charged, within a selected voltage of the desired charge level. THe regulation operates with discrete on and off conditions, so that significant battery current is consumed only during the "on" condition of actual capacitor charging.

When the user presses the shutter button 29 while the switch 32 is closed, the resultant closures of switches S1, S2 and S3 activate the switching circuit 46 to disable the power converter and thereby terminate further charging of the storage capacitor. The camera 10 first activates the lens-focusing motor 24a, FIG. 1, and then activates the trigger circuit 50 while operating the exposure unit 18. The enable circuit 48 has internal delay and hence continuously enables the trigger circuit both during the capacitor-regulating operation and for a brief interval after the OR circuit 44 is activated to terminate capacitor charging. Hence, the trigger circuit fires the flash tube from the charged capacitor 36 during the film exposure. The camera control unit 26 then activates the transport motor 20, and finally resets the automatic focus unit 24. These latter actions open switches S2 and S3. When the user also has released the shutter button so that switch S1 opens, the flash unit will again charge the capacitor 36 in preparation for another exposure. Release of the flash unit switch 32, however, terminates all charging operation.

FIG. 3 shows a preferred flash unit circuit for the charge control system of FIG. 2. The on-off switch 32 applies the battery voltage from between connector terminals 52a and 52e to the converter 38, which employs a transistor 66 with the emitter-collector path in series with the primary winding 68a of a step-up transformer 68. The transformer has a feedback winding 68b in series between the transistor 66 base and a voltage divider formed by fixed resistors 70 and 72. The series combination of a capacitor 74 and resistor 76 is connected between the positive battery voltage as applied by switch 32 and the interconnection of the feedback winding 68b with the voltage divider resistors 70 and 72. The circuit develops a stepped-up alternating voltage across the transformer 68 secondary winding 68c, across which a capacitor 78 is connected, and a diode 80 rectifies this output voltage to develop the power converter 38 output direct voltage. The energy storage capacitor 36, shown at the right side of FIG. 3, receives this high direct voltage output from the converter 38 and applies it across the terminals from the camera flash tube 40. This power converter 38 is similar to that described in U.S. Pat. No. 4,068,151, to which reference should be made for further details regarding this portion of the charge control system. A capacitor 82 is connected between the positive battery line 84 and the return path in the flash unit to increase the charge system efficiency by supplying peak currents for the power converter 38. It also suppresses electronic noise.

The comparator 42 (FIG. 2) as more fully described in U.S. Pat. No. 4,068,151 entitled "Regulated Strobe with Hysteresis" by G. Harrison is constructed with a series combination of fixed resistor 86, potentiometer 88, and fixed resistor 90 forming a voltage divider in parallel with the energy storage capacitor 36. The potentiometer tap applies a known portion of the voltage across the capacitor 36 to the cathode of a zener diode 92, the anode of which is connected to the base of a transistor 94. A capacitor 96 is connected between the transistor collector and the zener cathode, and a resistor 98 is connected between the base and the d.c. return or ground path, to which the transistor emitter is connected. The signal which the transistor 94 develops at the collector, which is the comparator 42 output signal, is applied through a series resistor 100 to the base of a transistor 102. A resistor 104 is connected between the transistor base and the positive battery voltage applied by switch 32. The emitter is connected to the positive battery line 84, and the transistor collector is connected through an isolating diode 106 and resistor 152 to the base of a transistor 150.

The signal at the collector of transistor 94 is also applied through a fixed series resistor 108 to the base of a further transistor 110 connected similar to the transistor 102 with the emitter direct coupled to the positive battery line 84 and a resistor 112 between that line and the transistor base. The transistors 102 and 110 constitute the regulator driver 43 of FIG. 2.

The enable circuit 48 employs a transistor 118 and has a time-delay input stage having a capacitor 114 connected between the transistor 110 collector and the return path, and a resistor 116 in series with the transistor 118 base. A resistor 120 is connected to the return path from the base of transistor 118, and the emitter is direct coupled to that line. A light-emitting diode 122 is in series with a resistor 124 between the positive battery-voltage line and the collector of transistor 118; the LED serves as the ready indicator 45 for the charge control system.

The output of the enable circuit is applied from the transistor 118 collector through the series combination of a fixed resistor 126 and a diode 128 to the base of the first transistor 130 in the trigger circuit 50. The collector of that transistor is connected to the connector pin 52g for receiving the flash pulse from the camera logic 26 (FIG. 2). Fixed resistors 132 and 134 are in series between the base of transistor 130 and the connector terminal 52d which receives battery voltage when switch S3 is closed. The emitter of transistor 130 is connected to the interconnection of these two resistors, as is a fixed resistor 136 which connects to the base of a second trigger transistor 138. The emitter of this transistor is also connected to the battery line, and a resistor 140 interconnects the collector of transistor 138 with the gate of a silicon controlled rectifier 142. The SCR 142 is arranged in a conventional trigger stage, with a parallel resistor-capacitor combination between the gate and the return line, and with the cathode connected to the return line. The SCR anode is connected to the interconnection of a voltage divider that is in parallel with the energy storage capacitor 36, and through a series coupling capacitor 139 to the primary winding of a trigger transformer 141. The transformer 141 secondary winding is connected to the trigger electrode of the flash tube 40.

With further reference to FIG. 3, the OR circuit 44 of FIG. 2 employs three logic diodes 144, 146 and 148 connected respectively to apply the signals from switches S1, S2 and S3 to the base of a transistor 150 through a series resistor 152. This transistor, and a further transistor 158, constitute the FIG. 2 switching circuit 46. A resistor 154 is connected between the transistor 150 base and the return path, and a resistor 156 couples the collector to the base of transistor 158. The transistor 158 emitter is connected to the battery line 84, and a resistor 160 is between the base and that line. The emitter-collector path of transmitter 158 is thus in parallel with the emitter-base junction of the power converter transistor 66, such that when the transistor 158 is conducting it in effect shunts the converter transistor 66.

The circuit of FIG. 3 converts the relatively low, for example six volt, voltage of the camera battery 34 to a significantly higher d.c. voltage, for example having a value in excess of three hundred volts, which it applies across the energy storage capacitor 36. During the initial charging operation, the power converter 38 draws significant current from the camera battery, for example initially in excess of ten amperes. The remainder of the circuit is basically inactive during the initial charge operation, i.e. all transistors other than the power converter transistor 66 are nonconducting. When the voltage across the storage capacitor 36 attains the desired maximum level and zener diode 92 conducts, transistor 94 begins conducting. The resultant voltage drop at the collector of that transistor biases transistors 102 and 110 on, to commence conduction. The emitter-base conduction in transistor 102 switches transistor 150 on, which in turn switches transistor 158 on. The resultant low emitter-collector impedance of transistor 158 in effect short circuits the power converter transistor 66 to terminate further operation of the converter. The charging of the storage capacitor 36 hence stops at the level which initiated transistor 94 conduction. When the discharge of capacitor 96 in the comparator 42 and discharge of the main energy storage capacitor 36 cause the comparator transistor 94 to cease conducting, transistor 158 is switched to the non-conductive state through transistors 102 and 150, thereby releasing the power converter to recharge the storage capacitor 36 to the specified level. The power converter now operates in a regulating mode, repetitively switching on and off to maintain the desired charge across the storage capacitor 36.

Transistor 110 in the regulator driver 43 tends to be driven by comparator transistor 94 for conduction and nonconduction similar to transistor 102, but the capacitor 114 at the input of the enable circuit maintains the enable circuit transistor 118 conducting while the circuit is regulating, i.e., while the power converter is switched on and off. Conduction through the enable circuit transistor 118 biases transistor 130 in the trigger circuit to conduct heavily, through resistor 134, when the camera logic unit 26 applies a flash pulse to the transistor collector, by way of connector 52. The resultant conduction in transistor 130 and resistor 134 drives transistor 138 to conduct, which in turn fires the silicon controlled rectifier 142. The trigger circuit then initiates the photograph-illuminating flash operation with the energy stored in the storage capacitor 36.

The camera logic unit 26 produces the flash pulse only when the user depresses the shutter button 29 which, as described, results in the closure of the camera switches S1, S2 and S3. Each switch closure causes one diode 144, 146, 148 of the OR circuit 44 to conduct, which biases transistor 150 to conduct. This, in turn, turns on transistor 158, which turns off transistor 66 so that the capacitor charging operation halts. The power converter 38 thereby remains inactive during the ensuing picture-taking operation.

The charge control system of FIGS. 2 and 3 thus charges the energy storage capacitor to a selected level and regulates the capacitor charge at that level. The system disables the trigger circuit from responding to a flash pulse except when the capacitor is at the desired charge level, and it disables the power converter throughout a camera cycle, i.e. the steps of automatic focusing, exposure, film processing and transport, and focus reset. The system readily accommodates operation with manual focusing when the operator selects that operation and the power converter is not disabled during the actual manual focus. The charge control system, thus restricts the disabling of the charging of the storage capacitor only to the time when another heavy current load is being applied to the camera battery which does not occur during the manual focus operation.

A further feature of the charge control system is that it also operates with a camera that, alternative to using an electronic flash unit, employs flash bulbs. That is, the connection of a flash bar, of the type conventional with a PRONTO! brand camera from the Polaroid Corporation, to the connector 52 to receive battery voltage through switch S3, to receive the flash pulse, and to convert with the ground return path, will operate the flash bulbs in the same manner presently encountered with that camera, and as disclosed in U.S. Pat. No. 4,064,519. Further, a camera constructed for use with a flash bar as set forth in the U.S. Pat. No. 4,064,519 adapts with few changes to electronic flash operation with a charge control system of this invention, as illustrated in FIGS. 2 and 3.

With further reference to FIGS. 2 and 3, prior to intiating a photographic exposure cycle, the camera 10 logic unit draws a relatively small sensing current through the flash unit resistor 134 and transistor 130. The current is thus applied between connector pins 52g and 52d. Resistor 134 has a small resistance, in the order of five ohms, and transistor 130 when biased for conduction has a low emitter-collector resistance for both the sensing current and the flash current. The sensing current is insufficient to bias transistor 138 to conduction and hence does not fire the flash tube. When the enable transistor 118 is nonconductive, however, transistor 130 is biased non-conductive and in effect blocks the sensing current. The logic unit responds to this nil-current condition by inhibiting film exposure and consequently does not open the camera shutter and does not produce the flash pulse. This is the result of an inactive enable circuit 48.

Figure 4:
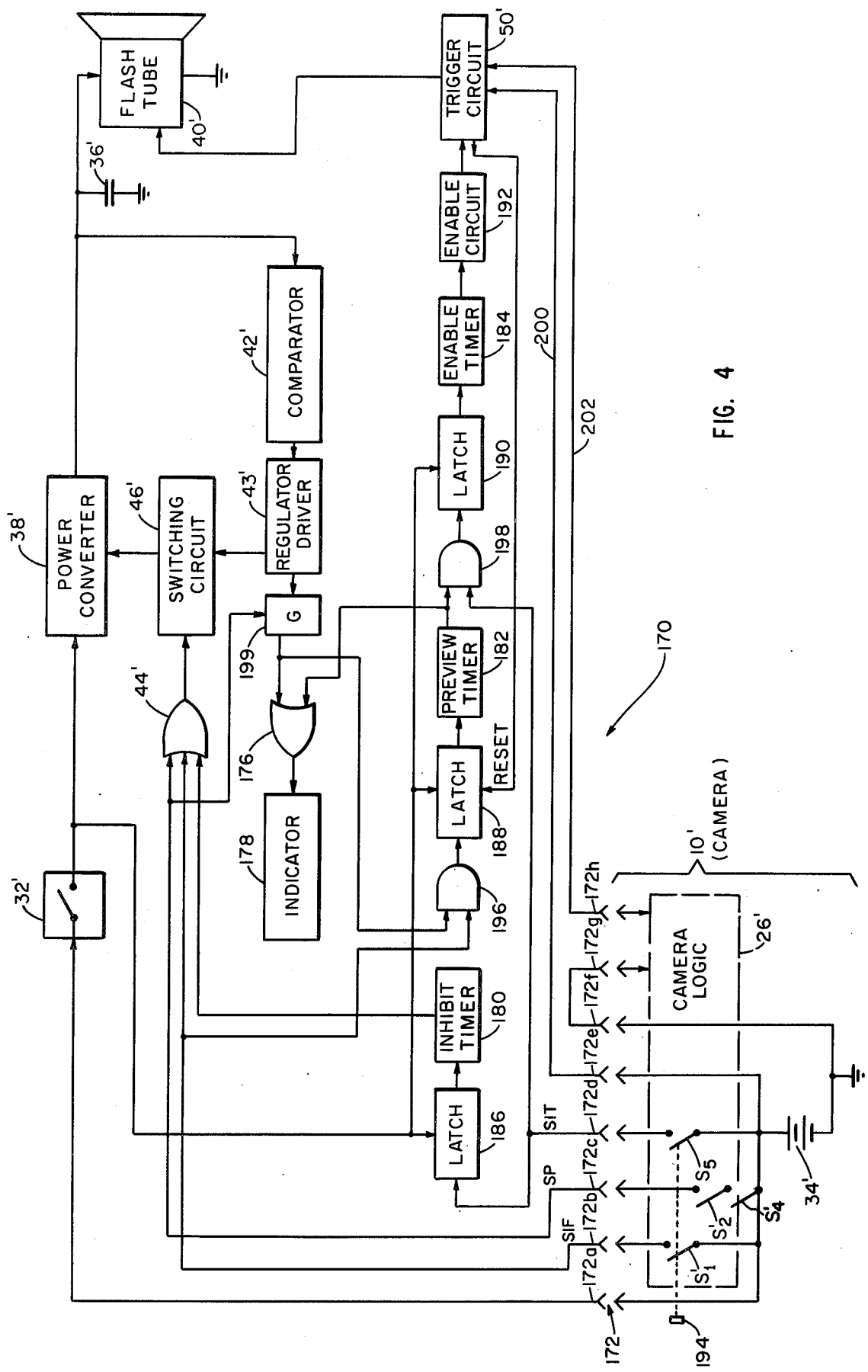
FIG. 4 is a block schematic diagram of another charge control system according to the invention.
Figure 6:
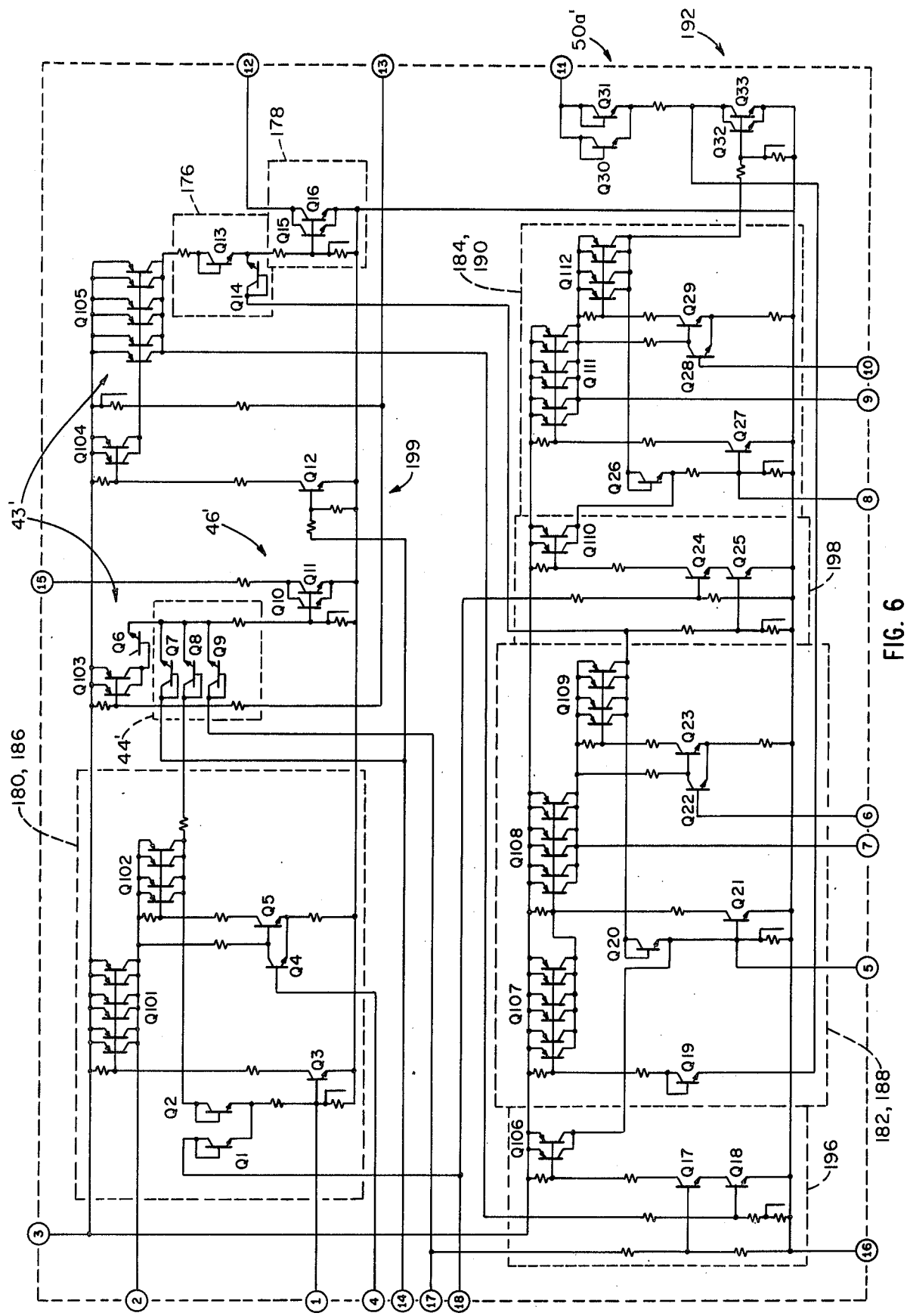
FIGS. 6 and 7 are detailed schematic diagrams of the charge control system of FIG. 4.
Figure 7:
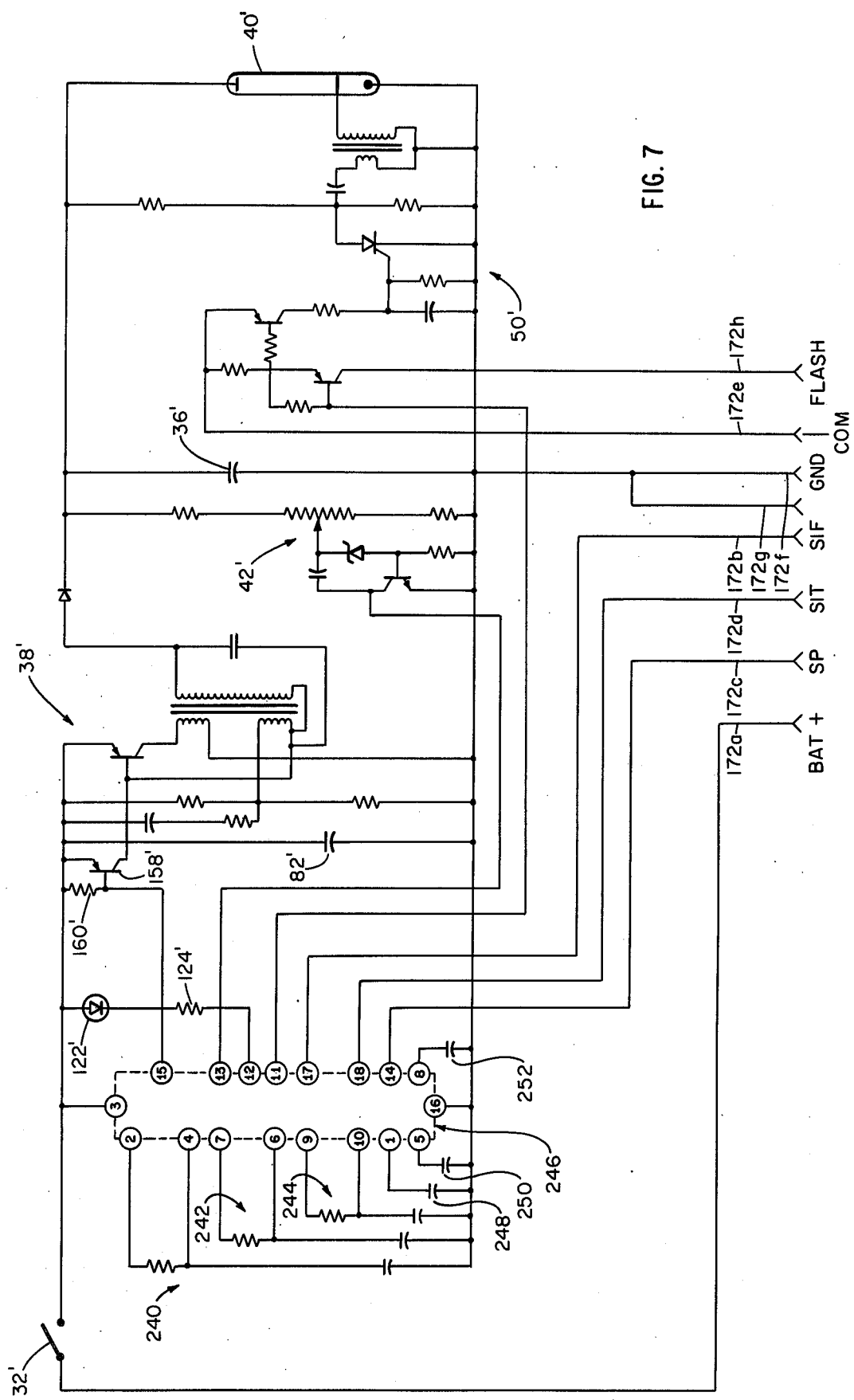

On the other hand, when the enable circuit is active so that transistor 118 is conductive—which occurs only when the capacitor 36 is adequately charged for specified flash—transistor 130 passes the sensing current with a value for example of forty milliamperes. The logic unit responds to the low impedance of resistor 134 and transistor 130 as signaled by this current to produce the flash pulse and commence a film-exposing shutter operation.

Where the camera 10 of FIG. 1 is of the single lens reflex type, the viewer 28 presents the user with an image through the camera lens system 16. Because this image is in focus only when the camera is focused, the user needs a brief interval, between the automatic focusing operation and the exposure operation, for framing and previewing the scene to be photographed. A single lens reflex camera charge control system which provides the user with such a framing and preview time is shown in FIGS. 4, 6 and 7. Elements of these figures which are the same as elements of FIGS. 2 and 3 bear the same reference numerals but with a prime superscript. Thus, FIGS. 4 and 5 employ an energy storage capacitor 36' and a flash tube 40'.

With specific reference to FIG. 4, the single lens reflex charge control system 170 plugs into a camera 10' with a connector 172. The system thus receives power from the camera battery 34' by way of the connector and applies it through a normally-open switch 32' to a power converter 38' that charges an energy storage capacitor 36' for firing a flash tube 40' when initiated by a trigger circuit 50'. A comparator 42', a regulator driver 43', and a switching circuit 46' regulate the power converter 38' to maintain the voltage across the storage capacitor 36' at the selected level of regulation, so long as the power switch 32' is closed and, further, so long as the switching circuit 46' receives no disabling signal from an OR gate 44'. The self-developing camera marketed by the Polaroid Corporation under the trademark SX-70 is a preferred example of a single lens camera 10' which can be fitted with automatic focusing and with this charge control system 170.

The SLR charge control system 170 provides the user with a preview time, as noted, but still schedules all operations of the camera and flash system such that the single battery 34' is subjected to only one high current operation at a time. The post-focus preview time occurs after the storage capacitor 36' is charged, and the power converter 38' is disabled during this interval. Accordingly, the purview time is limited to a selected interval during which the capacitor charge, although decreasing due to leakage, is sufficient to produce flash illumination of known intensity, to provide a properly-exposed photograph. A preview time of this duration which the invention provides is ample for most previewing, and the user normally initiates an exposure well within the interval. In those instances where the user does not initiate exposure during the available preview time, the system automatically disables further operations until the storage capacitor is recharged to the proper level. The charge control system 170 provides these and other features with three timers 180, 182 and 184, each driven by a latching circuit 186, 188 and 190 respectively and operating with AND gates 196 and 198. The illustrated system 170 operates as follows with a preview interval of ten seconds maximum duration. (This and the other times are specified only by way of example, and not by limitation.)

The illustrated camera 10' of FIG. 4 has a shutter button 194 which is depressed to two successive positions. Depressing the button by the first step closes a camera switch S1' to produce an S1F signal which initiates the automatic focus operation. In the camera flash unit, the S1F signal is applied to the OR circuit 44' to disable the power converter 38'. The S1F signal is also applied to an AND gate 196 which also receives a "regulate" signal which the regulator driver 43' produces when the storage capacitor 36' is charged to the selected level. In normal operation, the regulate signal occurs prior to the S1F signal. Thus, the regulate signal enables the AND gate 196 and the subsequent S1F signal actuates it to set the latch circuit 188 and to actuate the preview timer 182. The timer starts a preview timing level with a maximum duration of ten seconds.

The preview timing (PT) level from the timer 182 operates the indicator 178, through an OR circuit 176, to signal the user that the flash unit of the camera is fully charged and the camera is ready for a flash-illuminated exposure. The OR gate 176 also actuates the indicator in response to the regulate signal, except during the preview time, when a gate 199 is disabled.

The preview timing level from timer 182 is also applied to an AND gate 198, the output of which actuates the latch circuit 190 to start an enable timer 182. The AND gate 198 receives a second signal, designated S1T, which a switch S5 in the camera logic unit 26' produces when the shutter button 194 is depressed to its second position. The user must depress the shutter button to the second position during the preview interval when s/he as framed the scene and is ready to photograph it. The resultant closure of switch S5 initiates the exposure and film processing. If the user should depress the shutter button to its second position after the allowed preview interval, then the enable circuit 192 will operate to effectively block the camera sensing current so as to inhibit the camera from commencing a photographic exposure cycle in the manner as previously described.

To ensure that the power converter 38' remains disabled throughout the terminal portion of the camera cycle beginning with exposure, the S1T signal actuates the latch circuit 186 to start an inhibit timer 180. The resultant converter inhibit (CI) timing level, illustratively two and one-half seconds long, is applied to the OR circuit 44'. The converter inhibit level is present during the maximum terminal portion of a camera operating cycle to ensure that the power converter does not draw current during that operation.

As indicated, the S1T signal initiated at the commencement of exposure is also applied to the AND gate 198, which was previously enabled by the preview time (PT) level from timer 182. In response, the AND gate 198 actuates the latching circuit 190 and starts an enable timer 184, which in the illustrated embodiment produces a camera enable (CE) interval of seven hundred and fifty milliseconds. The CE level actuates the enable circuit 192, to terminate its normal inhibit state in which it disables the trigger circuit 50' from responding to a flash pulse from the camera 10'.

Thus, the S1T signal which results from pressing the shutter button 194 fully, i.e. to its second position, initiates with timer 184 an interval during which the camera logic 26' operates the camera exposure control elements and executes a film exposure cycle with flash illumination from the flash tube 40' in response to a flash pulse applied to the trigger circuit 50' by way of the conductor 202.

The illustrated camera 10' and the charge control system 170 employ a third signal (designated SP) which the OR circuit 44' applies to the switching circuit 46' to disable the power converter 38' during a camera cycle. This signal comes from a camera switch S2' that, like the switch S2 of FIGS. 2 and 3, is closed when the camera lens system is not in the rest position. For example, the switch S2' is responsive to the camera lens position and is normally open when the lens system is in the rest position. The switch closes when the automatic focus or another mechanism manually or otherwise moves the lens system from this position. The switch S2' thereby produces the SP signal throughout the time when the camera lens system is shifted from the rest position. Applying the SP signal to the OR circuit 44' ensures that the power converter 38' is disabled from the OR circuit 44' in the event the user releases the shutter button 194, which would remove the S1F signal, prior to commencement of the converter inhibit (CI) signal from the timer 180. There is also provided a manually actuable S4' switch in series with the S2' switch to enable the user to manually override the automatic focus as previously described in relation to switch S4. As is readily apparent, when the photographer overrides the automatic focus by opening S4', he then manually focuses the camera and depresses the shutter button 194 immediately to its second position without pausing at its first position.

The SP signal also disables the gate 199 from applying the regulate signal to OR circuit 176. This is desirable to ensure that the regulate signal can turn the indicator 178 on only before the preview time. With this arrangement, the indicator typically turns on when the regulate signal starts, and remains on until flash exposure or the end of the preview time.

With further reference to FIG. 4, each latch circuit and timer 186, 180, 188, 182, and 190, 184 normally draws no battery power. When the latch circuit receives an actuating signal, for example when latch circuit 188 receives an assertive output from AND gate 196, it applies battery power to the timer with which it is connected even after termination of the initial latch-actuating signal. The latch circuit 186 is connected with the converter inhibit timer 180 to reset to the normal inactive condition at the end of the timer interval or upon termination of the S1T signal by release of the shutter button 194, whichever occurs later. The enable-timer latch circuit 190 is reset to its normal inactive condition upon termination of the seven hundred and fifty millisecond interval of timer 184. The preview-time latch circuit 188 reset to the normal inactive condition upon either of two conditions. One is the end of the preview timing interval of the timer 182. The second condition is when the flash tube 40' is fired, and for this purpose as FIG. 4 shows the trigger circuit 50' is connected to a reset input of the latch circuit 188. The preview time (PT) output level from timer 182 thus terminates either at the end of the prescribed ten-second preview interval or when the flash tube is fired, whichever occurs earlier.

Figure 5:
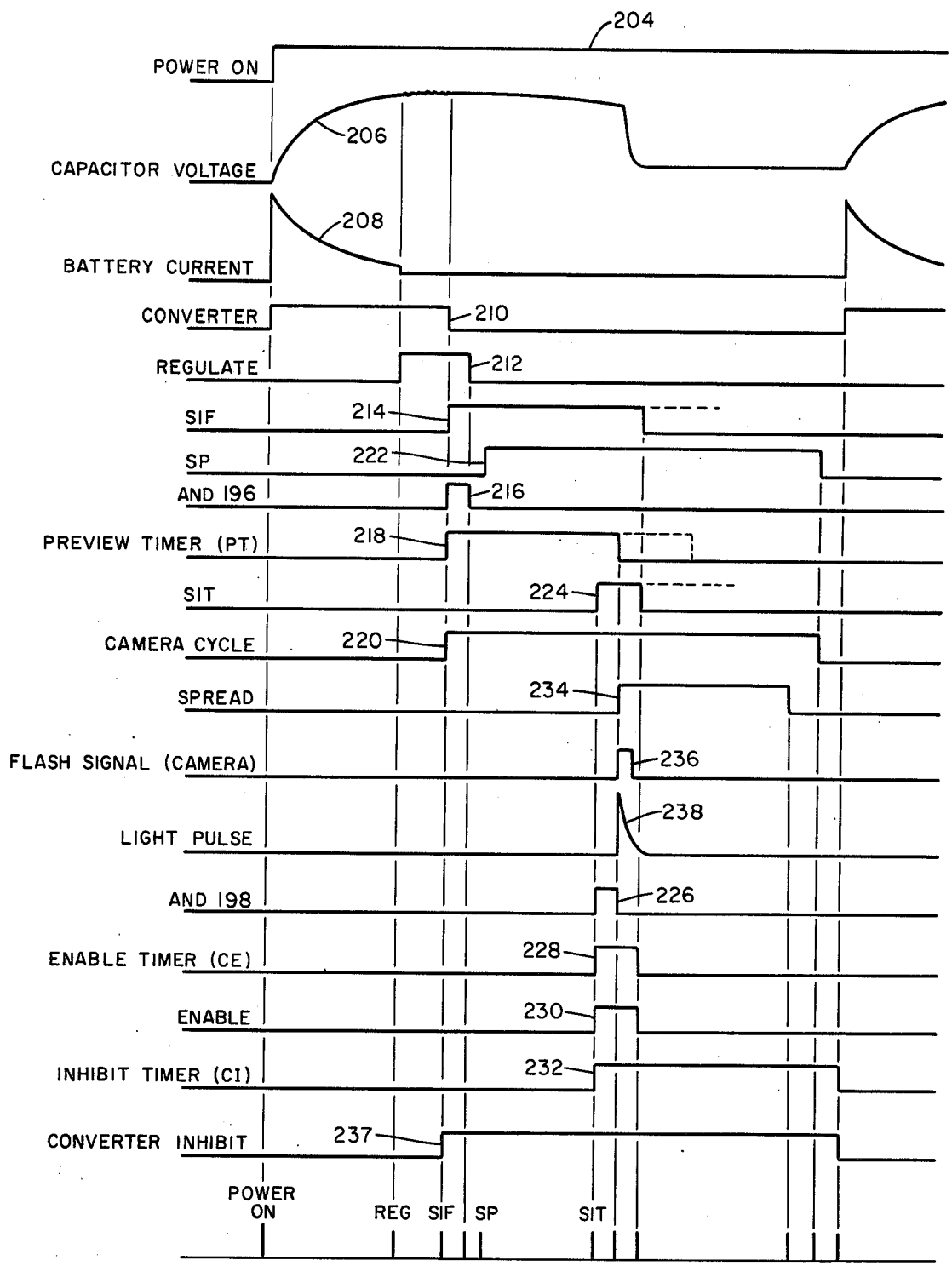
FIG. 5 is a timing diagram illustrating the operation of the charge control system of FIG. 4.

FIG. 5 shows waveforms which illustrate typical normal operation of the single lens reflex charge control system 170 of FIG. 4. Starting at the top of FIG. 5, the sequences start when the user closes the manual on-off switch 32'; waveform 204 shows that the user holds the switch closed throughout the operating cycle. Waveform 206 shows that the voltage across the energy storage capacitor 36' increases in the characteristic manner starting with closure of the switch 32' until it attains the desired value, at which point the power converter 38' switches on and off in a regulating mode to maintain the capacitor at the selected voltage level. During the time when the charge control system is regulating the charge on the storage capacitor 36', the waveform 206 has a ripple. When the user commences the preview time, the converter 38' is disabled and as apparent from the waveform 206, the voltage across the capacitor slowly drops. When the shutter button is depressed fully and the flash tube fired, the capacitor voltage drops sharply. The capacitor voltage then remains at a low level until, as seen at the right side of waveform 206, a fresh charge cycle begins.

The current which the charge control system draws from the camera battery 34', waveform 208, initially has a peak value and decreases as the capacitor charges. The charge control system 170 draws relatively little current, typically measured in milliamperes, during regulation and when the converter 38 is disabled. Waveform 210 depicts the time during which the converter form 38' is on for charging and regulating the capacitor 36', and waveform 212 depicts the time when the charge control system is in the regulating condition, i.e. when the regulating driver 43' applies assertive signals to the switching circuit 46' and to the OR gate 176.

As noted, the user initiates an automatic focus exposure cycle by depressing the shutter button 194 to the first position, which closes the switch S1', and waveform 214 shows the switch closure signal S1F which that even initiates. This signal terminates the converter operation, waveform 210 and, provided the system is in the regulating mode of operation, the S1F signal produces an assertive output from the AND circuit 196, waveform 216. This in turn initiates the preview time (PT) from the timer 182 as designated with waveform 218, and commences a camera operating cycle as designated with waveform 220. When the automatic focus mechanism, actuated within the camera logic 26' in response to the first movement of shutter button 194, moves the lens system 16 (FIG. 1) from the rest position, the camera switch S2' closes and produces the SP signal of waveform 222. The S1F signal of waveform 214 terminates when the user releases the shutter button, but the SP signal of waveform 222 terminates only when the automatic focus system returns the lens system to the rest position. The regulate signal of waveform 212 terminates when the comparator 42' signal reverts to the value responsive to a below-level capacitor charge. This occurs after the termination of converter operation due to the charge on the capacitor in the comparator 42' and the charge on the storage capacitor 36'. The preview timer signal of waveform 218 terminates, as described, at the end of the timer 182 interval or when the flash tube is fired, whichever occurs first. Waveform 218 designates these two conditions with a broken line and with a solid showing, respectively.

The next sequence of operations commences when the operator depresses the shutter button 194 fully to close the switch S5 which initiates the S1T signal, waveform 224. This signal terminates upon release of the shutter button. The S1T signal produces an assertive output from AND circuit 198, which is already enabled by the output from the timer 182, as designated with waveform 226. This signal in turn produces the timer 184 enable interval of waveform 228, which actuates the enable circuit 192 as designated with waveform 230. Another signal produced in response to the S1T signal of waveform 224 is the converter inhibit signal, waveform 232, which timer 180 produces and which is the only controlling assertive signal operating to inhibit the convertor for the duration of the exposure cycle when the camera is operated in its manual focus mode.

Within the camera 10', the complete pressing of the shutter button 194 turns on the motor 22 (FIG. 1) which drives the spread rolls 20 for a spread interval designated with waveform 234. The camera logic 26' in addition produces a flash pulse as shown with waveform 236 and in response the trigger circuit 50' of FIG. 4, enabled by circuit 192, fires the flash tube 40' to produce a light pulse, waveform 238. The flash pulse of waveform 236 occurs when the enable circuit is active, waveform 230, which corresponds to the enable interval output from timer 184, waveform 228. Upon discharge of the capacitor 36', waveform 206, with the flash of waveform 238, the preview interval of waveform 218 terminates. The inhibit timer 180 interval of waveform 232, however, terminates a fixed time, illustrated as two and onehalf seconds, after initiation. This is selected to come after the termination of all camera operations, waveform 220.

The final waveform 237 in FIG. 5 depicts the total interval during which the power converter 38' is inhibited by any one of the inhibiting signals S1F of waveform 214, SP of waveform 222, and converter inhibit (CI) of waveform 232. The waveform 237 thus depicts the composite time during which the OR circuit 44' applies an assertive signal to the switching circuit when the camera is operated in its automotive focus mode.

A preferred construction of the single lens reflex charge control system 170 of FIG. 4 employs an integrated circuit 246 which FIG. 6 details and which connects with discrete components in the manner which FIG. 7 shows. The power converter 38', the storage capacitor 36', the flash tube 40', the comparator 42', and the trigger circuit 50' appear in FIG. 7 in a manner similar (but not necessarily identical) to the construction described with reference to FIG. 3. Further, the circuit of FIG. 7 includes a light-emitting diode 122' and a series resistor 124' of the indicator 178. A filter capacitor 82' is connected across the battery voltage applied through the switch 32'.

FIG. 7 also shows resistor-capacitor timing circuits 240, 242 and 244 connected with the integrated circuit 246 and which are part of the FIG. 4 timers 180, 182 and 184. The remaining elements shown in FIG. 7 are noise suppressing by-pass capacitors 248, 250 and 252 which connect to circuits within the integrated circuit 246 at the designated terminal pins.

The FIG. 6 diagram of the integrated circuit 246 is marked to designate the component stages which correspond to elements in the FIG. 4 system 170. As noted, each timer in addition includes one resistor-capacitor pair 240, 242 and 244 of FIG. 7. In particular, latch circuit 186 and timer 180 employ the FIG. 6 transistors Q1, Q2, Q3, Q4 and Q5 and transistors Q101 and 102. AND circuit 196 employs transistors Q17, Q18 and Q106, and the latch circuit 188 and timer 182 which it operates employ transistors Q19 through Q23 and transistors Q107 through Q109. AND circuit 198 employes transistors Q24, Q25 and Q110, and the latch circuit 190 and timer 184 employ transistors Q26 through Q29, and transistors Q111 and Q112.

Transistors Q32 and Q33 in FIG. 6 form the enable circuit 192, and transistors Q30 and Q31 form an input stage 50a' of the trigger circuit. The converter disabling OR circuit 44' employes transistors Q7, Q8 and Q9; and the other OR circuit 176 employs transistors Q13 and Q14. The FIG. 4 switching circuit 46' employs transistors Q10 and Q11, and the FIG. 7 transistor 158'. The regulator driver 43' employs the integrated circuit transistors Q103 and Q6 to drive the switching circuit 46' and employs the integrated circuit transistor Q105 to drive the OR gate 176. Transistors Q12 and Q104, which block transistor Q105 from responding to the regulate signal when the SP signal is present, form the gate 199. The remaining elements in the integrated circuit are connected with transistors Q15 and Q16, which are part of the indicator unit 178 which drives the light-emitting diode 122' in FIG. 7.

Those skilled in the art will understand the further construction and operation of the FIG. 4 charge control system as detailed in FIGS. 6 and 7. It will further be apparent that other constructions can be used to implement the system of FIG. 4 within the scope of the invention.

The invention thus provides, in one illustrated embodiment, an electronic flash unit for an automatic-focusing and self-developing camera that has an electrical circuit for controlling a camera cycle. The camera battery powers a focus mechanism, an exposure mechanism with a shutter and a film transport mechanism. The flash unit is powered by the camera battery and has a storage capacitor, a discharge-type flash tube, a regulated charge converter for charging the capacitor, and a trigger circuit. The flash unit connects with the camera circuit to receive the battery voltage and to receive camera signals produced incident to operating the focus mechansim, the exposure mechanism, and the transport mechanism. The camera also applies a flash-initiating signal to the flash unit.

A first circuit in the flash unit, embodied in FIGS. 2 and 3 as including the OR gate 44 and the switching circuit 46, responds to a plurality of these signals for disabling the regulated charge converter from drawing capacitor-charging current during operation of current-consuming camera mechanisms. A normally-disabled further circuit in the flash unit, embodied in FIGS. 2 and 3 as including the enable circuit 48 and the trigger circuit 50, responds to a selected charge level on the storage capacitor for enabling the discharge of the flash tube by the trigger circuit, in response to the camera-produced flash-initiating signal, and for signaling the camera for operation of the shutter. The first circuit thus allows charging of the flash capacitor only when camera mechanisms are not drawing significant current, and the second circuit allows a film exposure and flash-tube discharge only in response to selected charge conditions of the storage capacitor.

It will thus be seen that the objects set forth above, among those made apparent from the preceeding description, are efficiently attained and, since certain changes may be made in the above constructions without departing from the scope of the invention, it is intended that all matter contained in the above description or shown in the accompanying drawings be interpreted as illustrative and not in a limiting sense.

Further, the following claims are intended to cover all of the generic and specific features of the invention herein described, and all statements of the scope of the invention which as a matter of language might be said to fall therebetween.

What is claimed is:

1. An electronic flash apparatus for use with a self-processing camera of the type having a variable focus objective lens, means for automatically processing and advancing self-developing type film units from the camera, electrically energizable control means responsive to the manual actuation thereof for automatically driving the objective lens from an initial at rest position to a focused position with respect to the scene to be photographed, for then automatically controlling a photographic cycle including the exposure, processing and advancement of respective film units, and for then automatically returning the objective lens to its initial at rest position, the camera additionally having means for manually disabling the automatic focus to permit the manual focusing of the objective lens, an electrical connector together with means for providing at the connector a first signal commencing in response to the manual actuation of the energizable control means and a second signal commencing in response to the objective lens being automatically driven from its initial at rest position and terminating in response to the objective lens being returned to its initial at rest position, a steady state supply voltage for energizing the flash apparatus, and a flash fire signal, said electronic flash apparatus comprising:

a housing;
   a flash discharge tube;
   an energy storage capacitor;
   an electrical connector from said housing complimentary to the camera connector for releasable connection therewith;
   means energized by the camera supply voltage for charging the capacitor;
   means responsive to the flash fire signal for discharging said capacitor through said discharge tube to produce an illuminating flash of light; and
   control means responsive to the continued manual actuation thereof for enabling said charging means to charge said capacitor from the camera supply voltage, said control means being further responsive to either one of the first or second signals from the camera for disabling said charging means from charging said capacitor so as to draw no further significant current from the camera supply voltage from the instant of manual actuation of the camera control means to the time that the objective lens is returned to its initial at rest position when the camera is operated in its automatic focus mode or from the instant of manual actuation of the camera control means to at least the expiration of the photographic cycle when the camera is operated in its manual focus mode.

2. The flash apparatus of claim 1 wherein the camera includes means for providing a sensing current to that portion of the connector which furnishes the flash fire signal prior to the commencement of the photographic cycle and for disabling the camera control means from initiating the photographic cycle in response to the sensing of a current below a select value, and wherein said flash control means includes means responsive to said capacitor being charged to a voltage within said select limits for presenting a sufficiently low impedance to that portion of said flash connector which receives the flash fire signal to insure that the sensed current will be above the select value thereby enabling the camera control means to initiate the photographic cycle.

3. The flash apparatus of claim 2 wherein said flash control means further includes means for disabling said discharging means from discharging said capacitor in response to the fire flash signal when said capacitor is not charged to a voltage within said select limits.

4. The flash apparatus of claim 2 wherein: the camera is of the single lens reflex type and the camera control means responds to a first step of the manual actuation thereof to automatically drive the objective lens from its initial at rest position to its focused position and thereafter responds to a second step of the manual actuation thereof to automatically initiate and control the photographic cycle, said flash apparatus control means includes timing means actuated in response to the first step of the manual actuation of the camera control means for providing a determinate time period of sufficient time for the objective lens to be automatically focused and the scene to be photographed to be viewed and composed, said timing means further operating to cause said presenting means to present a sufficiently high impedance to that portion of said flash connector which receives the flash fire signal to cause the sensed current to be below the select value thereby disabling the camera control means from initiating the photographic cycle in response to the second step of the manual actuation not occurring within said determinate time period.

5. The flash apparatus of claim 4 wherein the flash apparatus control means includes additional timing means actuated in response to the second step of the manual actuation of the camera control means for providing another determinate time period at least equal to the time of the photographic cycle, said additional timing means further operating to provide a disable signal during the duration of said other determinate time period in order to disable said charging means from charging said capacitor during said other determinate time period.

6. The flash apparatus of claim 1 wherein said capacitor charging means also regulates the capacitor voltage within select limits.

7. A camera and flash apparatus for use with self-developing type film units comprising:
   a variable focus objective lens;
   means for automatically processing and advancing self-developing type film units from said camera;
   electrically energizable camera control means responsive to the manual actuation thereof for automatically driving said objective lens from an initial at rest position to a focused position with respect to the scene to be photographed, for then automatically controlling a photographic cycle including the exposure, processing and advancement of respective film units, and for then automatically returning said objective lens to its initial at rest position;
   means for manually disabling the automatic focus to permit the manual focusing of said objective lens;
   means for providing a first signal commencing in response to the manual actuation of said energizable control means and a second signal commencing in response to said objective lens being automatically driven from its said initial at rest position and terminating in response to said objective lens being returned to its said initial at rest position;
   means for facilitating connection to a steady state supply voltage to energize said camera;
   means for providing a flash fire signal at the appropriate instant during film exposure;
   a flash discharge tube;
   an energy storage capacitor;
   means energized by the steady state supply voltage for charging said capacitor;
   means responsive to said flash fire signal for discharging said capacitor through said discharge tube to produce an illuminating flash of light; and
   flash control means responsive to the continued manual actuation thereof for enabling said charging means to charge said capacitor from the steady state supply voltage, said flash control means being further responsive to either one of the first or second signals for disabling said charging means from charging said capacitor so as to draw no further significant current from the steady state supply voltage from the instant of manual actuation of said camera control means to the time that said objective lens is returned to its initial at rest position when said camera is operated in its automatic focus mode or from the instant of manual actuation of said camera control means to at least the expiration of the photographic cycle when said camera is operated in its manual focus mode.

8. The camera of claim 7 wherein said capacitor charging means also regulates the capacitor voltage within select limits.

9. The camera of claim 8 including means for providing a sensing current to the portion of said capacitor discharging means which receives the flash fire signal prior to the commencement of the photographic cycle and for disabling the camera control means from initiating the photographic cycle in response to the sensing of a current below a select value, and wherein said flash control means includes means responsive to said capacitor being charged to a voltage within said select limits for presenting a sufficiently low impedance to that portion of said capacitor discharging means which receives the flash fire signal to insure that the sensed current will be above the select value thereby enabling the camera control means to initiate the photographic cycle.

10. The camera of claim 9 wherein said flash control means further includes means for disabling said discharging means from discharging said capacitor in response to the fire flash signal when said capacitor is not charged to a voltage within said select limits.

11. The camera of claim 9 including means for providing a single lens reflex capability and wherein: the camera control means responds to a first step of the manual actuation thereof to automatically drive said objective lens from its said initial at rest position to its said focused position and thereafter responds to a second step of the manual actuation thereof to automatically initiate and control the photographic cycle, said flash apparatus control means includes timing means actuated in response to the first step of the manual actuation of said camera control means for providing a determinate time period of sufficient time for said objective lens to be automatically focused and the scene to be photographed to be viewed and composed, said timing means further operating to cause said presenting means to present a sufficiently high impedance to that portion of said capacitor discharging means which receives the flash fire signal to cause the sensed current to be below the select value thereby disabling said camera control means from initiating the photographic cycle in response to the second step of the manual actuation not occurring within said determinate time period.

12. The camera of claim 11 wherein the flash control means includes additional timing means actuated in response to the second step of the manual actuation of said camera control means for providing another determinate time period at least equal to the time of the photographic cycle, said additional timing means further operating to provide a disable signal during the duration of said other determinate time period in order to disable said charging means from charging said capacitor during said other determinate time period.

* * * * *